United States Patent [19]
Johnson et al.

[11] Patent Number: 5,967,019
[45] Date of Patent: *Oct. 19, 1999

[54] SAUCER AND SINGLE CUP BREWER SYSTEM

[75] Inventors: Barrie Lee Johnson, Rte. 85, No. 16 P.O. Box 51; Dan L. Hutchens, 3 Cranberry Pond Rd., both of Raymond, Me. 04071

[73] Assignees: Barrie Lee Johnson; Dan L. Hutchens, both of Raymond, Mass.

[ * ] Notice: This patent is subject to a terminal disclaimer.

[21] Appl. No.: 09/076,245

[22] Filed: May 12, 1998

Related U.S. Application Data

[63] Continuation-in-part of application No. 08/795,944, Feb. 5, 1997, Pat. No. 5,806,409.

[51] Int. Cl.$^6$ ........................................... A47J 31/00
[52] U.S. Cl. ................... 99/323; 99/279; 99/295
[58] Field of Search .................. 99/323, 295, 279; 426/433

[56] References Cited

U.S. PATENT DOCUMENTS

| | | |
|---|---|---|
| 739,470 | 9/1903 | Wegner . |
| 1,601,613 | 9/1926 | Fenyves . |
| 1,795,535 | 3/1931 | Anders . |
| 2,370,096 | 2/1945 | Walder et al. ............................ 99/292 |
| 2,401,529 | 6/1946 | Varney et al. ............................ 99/279 |
| 3,345,935 | 10/1967 | Waline .................................... 99/295 |
| 3,354,812 | 11/1967 | Gorton .................................... 99/323 |
| 3,854,389 | 12/1974 | Hillemann ................................ 99/295 |
| 4,143,590 | 3/1979 | Kasakoff .................................. 99/296 |
| 4,602,557 | 7/1986 | Yip .......................................... 99/279 |
| 4,689,147 | 8/1987 | Leoncavallo et al. ................... 210/232 |

FOREIGN PATENT DOCUMENTS 374158  2/1964  Switzerland .

OTHER PUBLICATIONS

MiniMinit Filter Bag Product, Circa 1996.
Coffee Quick Microwave Coffee Maker, Circa 1996.
Nor Pro Brew Bag Product, Circa 1996.

*Primary Examiner*—Reginald L. Alexander
*Attorney, Agent, or Firm*—Robert C. Kain, Jr.

[57] ABSTRACT

The single cup coffee or tea brewer system is adopted to retain a predetermined amount of ground coffee beans or tea for a "perfect" single cup of brewed coffee or tea. The brewing system includes an elongated handle, a basket formed at one end of the handle and a movable basket top member having a leg hinged to the handle. The basket defines a top, peripheral rim and a ground coffee and tea leaf impervious screen at a bottom region thereof. The basket has a predetermined size substantially equivalent to the correct amount of ground coffee or tea for the single cup of brewed coffee or tea. The volume or size of the basket is established below the top plane of the basket rim. The movable basket top member has an elevated basket top cover. The basket top cover includes at least one ground coffee and tea leaf impervious screen disposed over the basket. This permits liquid to flow through the basket and the retained ground coffee beans or tea leaf. The basket top cover has a complementary rim which cooperates with the basket rim to seal the ground coffee beans or tea leaf in the basket. Additionally a saucer, shaped to fit within the basket, may be used as a stand for the brewing system after the brew cycle. The saucer is sized to sit beneath the lower basket screen.

27 Claims, 3 Drawing Sheets

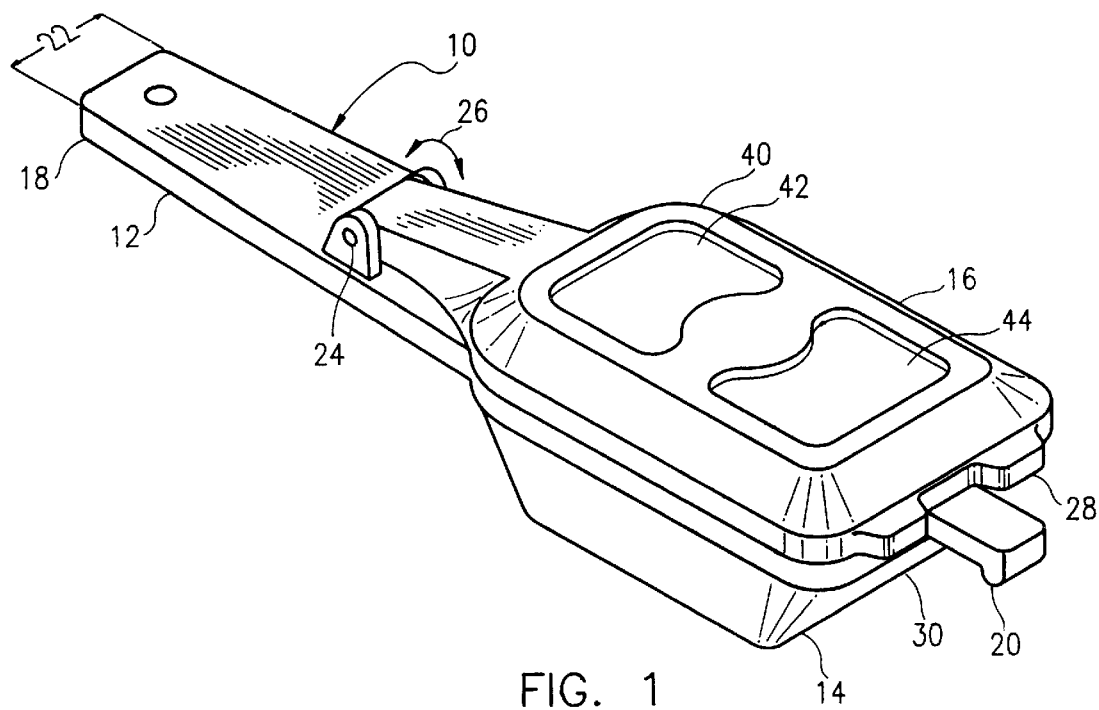
FIG. 1
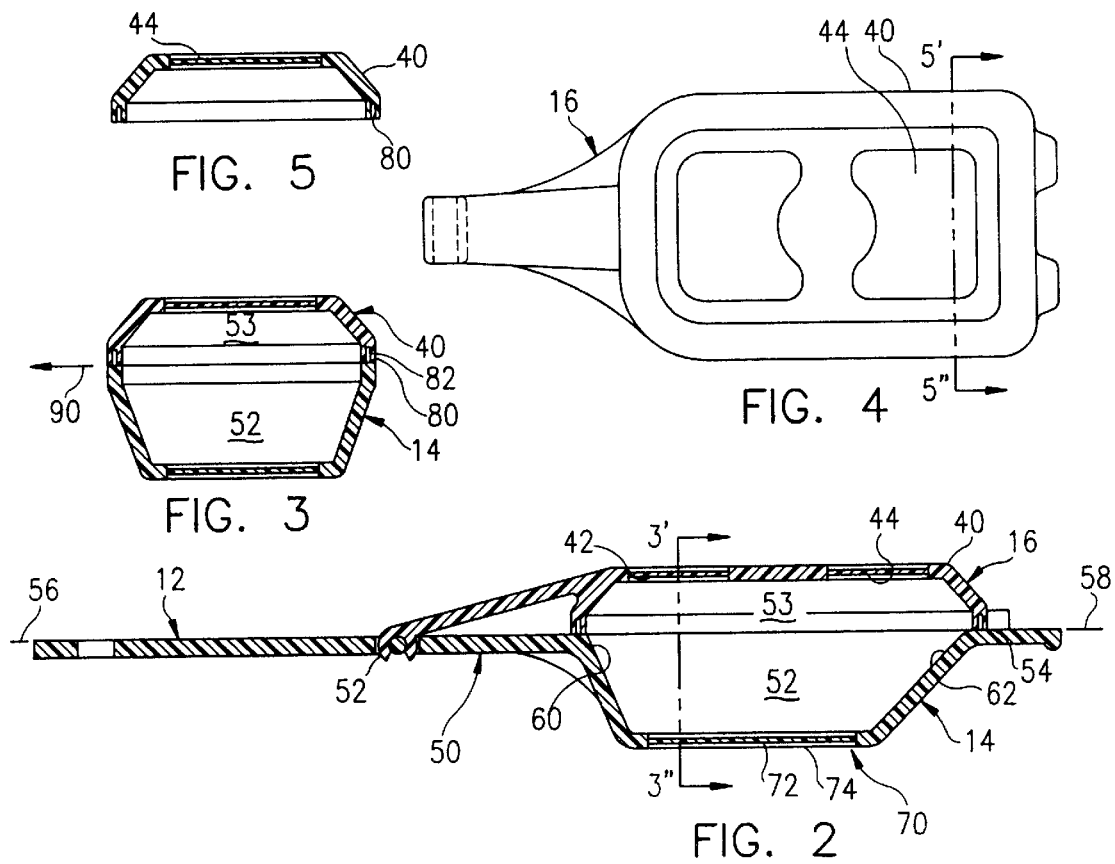
FIG. 5
FIG. 3
FIG. 4
FIG. 2

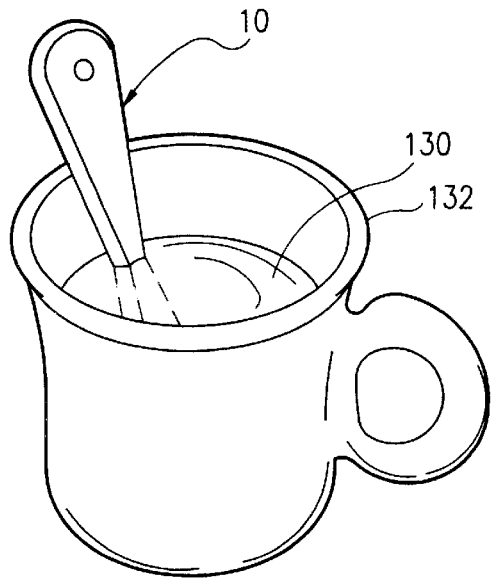
FIG. 7
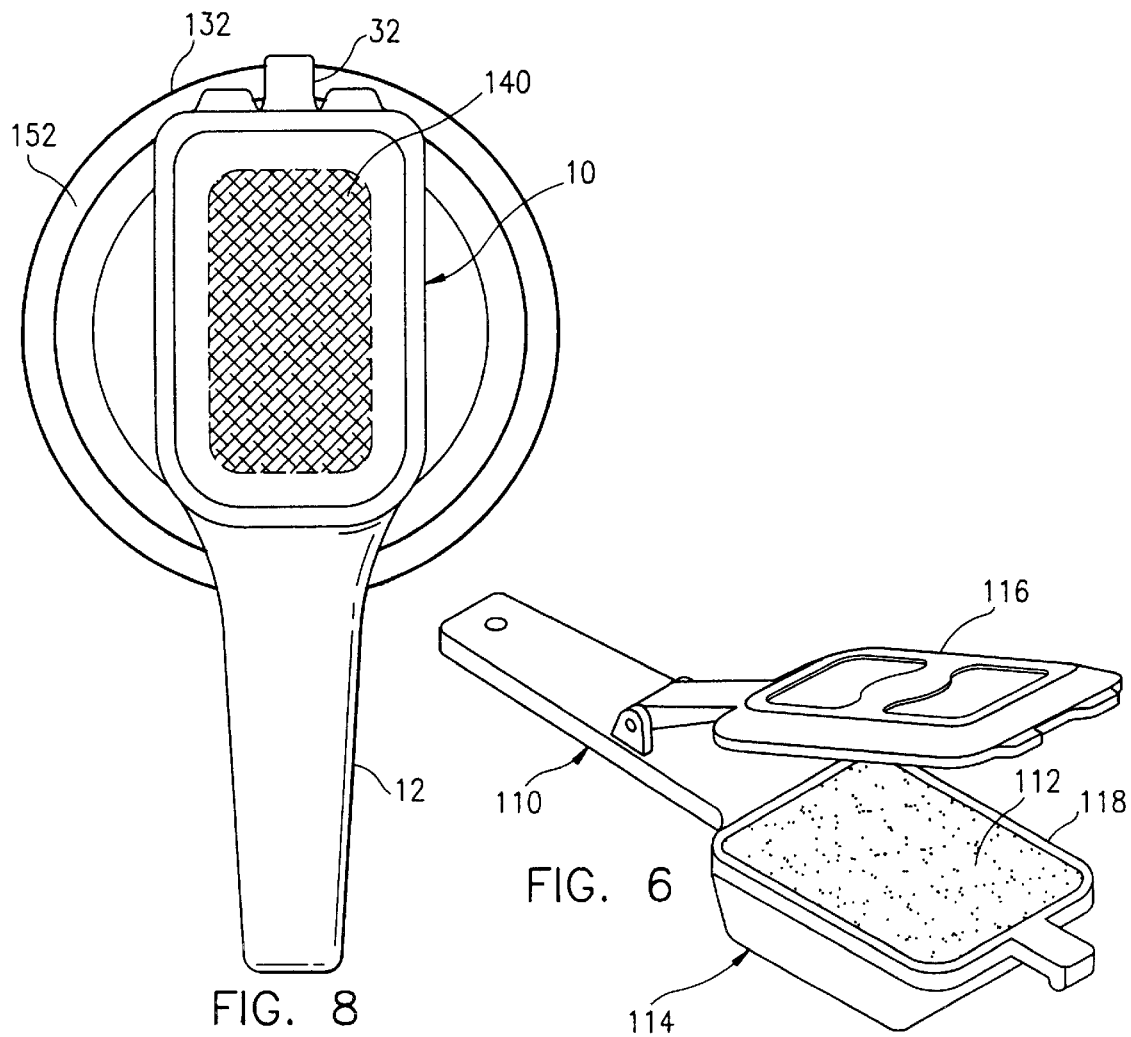
FIG. 8
FIG. 6

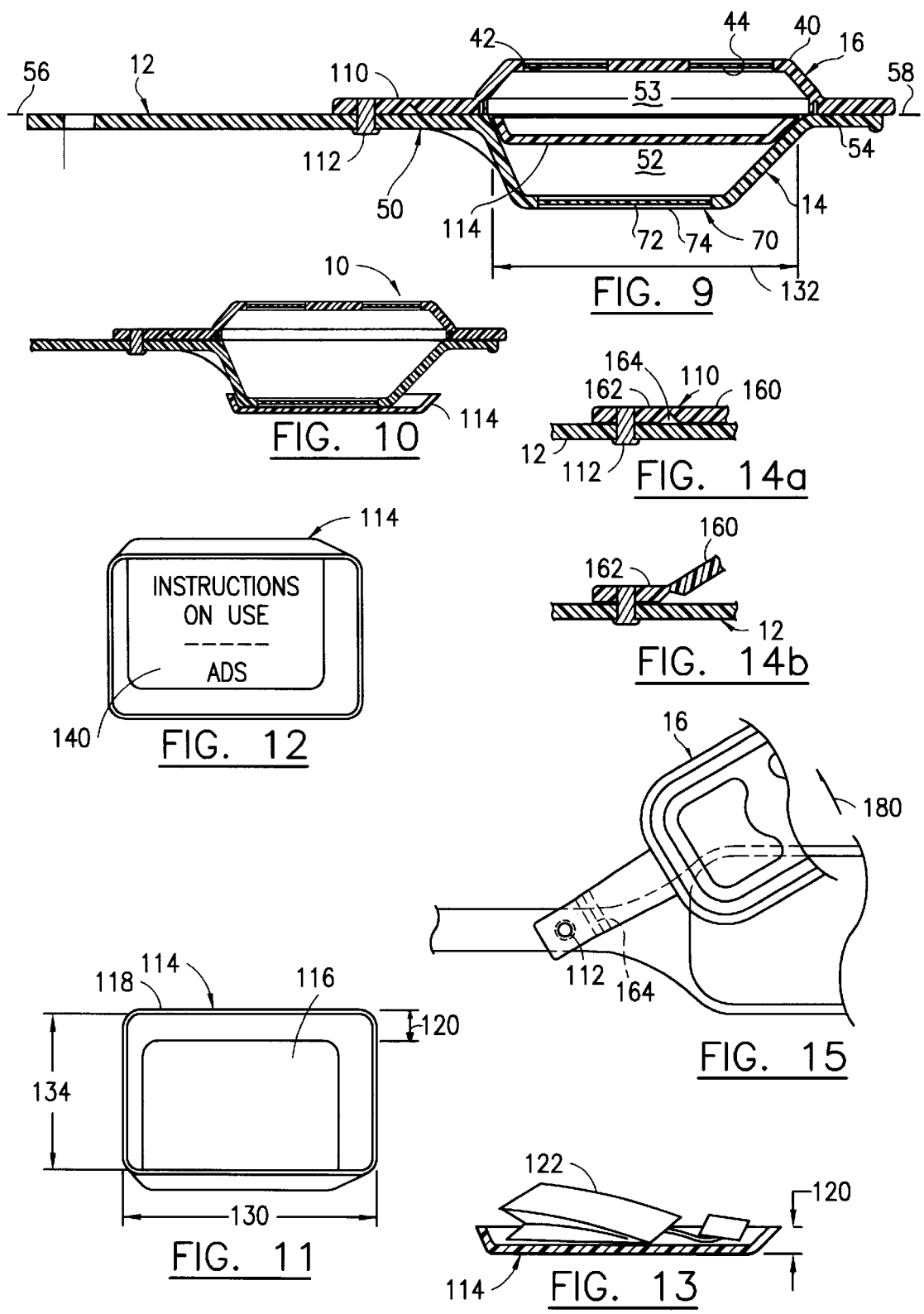

5,967,019

SAUCER AND SINGLE CUP BREWER SYSTEM

This is a continuation-in-part of U.S. patent application Ser. No. 08/795,944 filed Feb. 5, 1997 now U.S. Pat. No. 5,806,409.

The present invention relates to a saucer for a single cup brewer basket system.

BACKGROUND OF THE INVENTION

U.S. Pat. No. 3,345,935 to Waline discloses a coffee brewing basket for holding disposable coffee bags. The brewing basket is substantially square and has two handles on opposite sides. The disposable coffee bags include a water impervious layer with holes leading to coffee retaining chambers. Filter layers capture the coffee in the chambers.

U.S. Pat. No. 1,795,535 to Anders discloses a tea infuser comprising a gauze bag, a stick or rod which appears to function as a handle, and a string for tying the bag to the stick or rod.

The following patents disclose additional background art: U.S. Pat. No. 2,370,096; U.S. Pat. No. 2,401,529; U.S. Pat. No. 3,854,389; U.S. Pat. No. 4,143,590; U.S. Pat. No. 4,602,557; and U.S. Pat. No. 4,689,147.

Coffee bags manufactured by Mini Minit Products Ltd. may be utilized to retain coffee in a pouch. The pouch is then placed in the hot water in a coffee cup. Reusable brew bags manufactured by NorPro utilize a high quality cotton bag which is cinch closed by a string.

OBJECTS OF THE INVENTION

It is an object of the present invention to provide a single cup brewer system.

It is another object of the present invention to provide a single cup brewer system for tea or coffee.

It is another object of the present invention to provide a brewer system which can be utilized as a complete utensil.

It is a further object of the present invention to utilize a brewer system which is reusable, microwavable and highly portable.

It is an additional object of the present invention to provide a coffee brewer system wherein the basket of the brewer system is utilized to measure the correct amount of ground coffee beans for the single cup of coffee.

It is an additional object of the present invention to provide a brewer system which does not utilize a paper filter.

It is another object of the present invention to provide a coffee or tea brewer system which, after infusing the hot liquid with the coffee bean or tea leaf flavor, the brewing system can rest atop the cup such that the brewed, hot liquid exits the basket and drips into the cup.

It is an additional object of the present invention to provide a coffee or tea brewer system which utilizes a seal between the basket and the basket top cover which blocks the exit of coffee grinds or tea leaves from the basket.

It is a further object of the present invention to provide a saucer which can be captured within the brewer basket in a storage mode, and then, in an operable mode, be used to support said brew basket and capture post-brew droplets therefrom.

It is an additional object of the present invention to imprint directions for brew system use on the saucer.

It is another object of the present invention to utilize the saucer as a stand for tea bags.

SUMMARY OF THE INVENTION

The single cup coffee or tea brewer system is adopted to retain a predetermined amount of ground coffee beans or tea leaves for a "perfect" single cup of brewed coffee or tea. The brewing system includes an elongated handle, a basket formed at one end of the handle and a movable basket top member having a leg hinged to the handle. The basket defines a top, peripheral rim and a ground coffee or tea leaf impervious screen at a bottom region thereof. The basket has a predetermined size substantially equivalent to the correct amount of ground coffee or tea leaf for the single cup of brewed coffee or tea. The volume or size of the basket is established below the top plane of the basket rim. The movable basket top member has an elevated basket top cover. The basket top cover includes at least one ground coffee and tea leaf impervious screen disposed over the basket. This permits liquid to flow through the basket and the retained ground coffee beans or tea leaves. The basket top cover has a complementary rim which cooperates with the basket rim to seal the ground coffee beans or tea leaves in the basket. A saucer is sized to (a) fit within the basket for easy storage when the brewer system is not in use, and (b) act as a stand to capture drips or leakage after infusing the hot water with coffee or tea.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates the single cup coffee or tea brewer system in accordance with the principles of present invention;

FIG. 2 diagrammatically illustrates a cross-sectional view of a brewer system in accordance with the principles of the present invention;

FIG. 3 diagrammatically illustrates a cross-sectional view of the brewing basket from the perspective of section line 3'–3" in FIG. 2;

FIG. 4 diagrammatically illustrates the movable basket top member in accordance with the principles of the present invention;

FIG. 5 diagrammatically illustrates a cross-sectional view of the basket top member from the perspective of section line 5'–5" in FIG. 4;

FIG. 6 diagrammatically illustrates the brewer system either during the initial loading phase or after the coffee or tea has been brewed prior to the discharge phase;

FIG. 7 diagrammatically illustrates the brewing phase for the brewer system;

FIG. 8 diagrammatically illustrates the "drip" phase for the brewer system;

FIG. 9 diagrammatically illustrates another embodiment of the brewing basket with the saucer captured in the basket;

FIG. 10 illustrates the brewing basket on the saucer stand (typically after a brewing session) (see FIGS. 7–8);

FIG. 11 illustrates the flat plate and rising peripheral wall of the saucer;

FIG. 12 illustrates the imprinted instructions on the saucer;

FIG. 13 illustrates the use of the saucer as a tea bag stand; and

FIGS. 14a, 14b and 15 diagrammatically illustrate the hinge and rotation of the basket cover.

DETAILED DESCRIPTION OF THE PREFERRED EMBODIMENTS

The present invention relates to a single cup coffee or tea brewer system and, in a further development, the incorporation of a saucer stand.

FIG. 1 diagrammatically illustrates single cup brewer system 10 which includes an elongated handle 12, a basket member 14 and a movable basket top member 16. The total length of brewing system 10 from handle end 18 to resting tip 20 is such that brewing system 10 extends outboard beyond the liquid in a cup when the system is brewing coffee or tea. This is shown in connection with FIG. 7.

The total width 22 of brewing system 10 should not preferably exceed 1½ inches. Accordingly, brewing system 10 has a generally elongated rectangular shape adapted to fit into a cup. The elongated, rectangular shape is best viewed in FIG. 8.

Movable basket top member 16 is attached to handle 12 via hinge system 24. This enables basket top member 16 to rotate as shown by double headed arrow 26. This rotation exposes the interior portion of basket 14. Finger tabs 28, 30 extend outboard beyond basket top member 16. Lower finger tab 32 extends outboard beyond basket 14.

To open movable basket top member 16, the user places one or more fingers beneath finger tabs 28, 30 and other fingers on basket tab 32 and moves the basket top member 16 in an opposite direction with respect to basket 14. The basket top member then moves in the direction counter clockwise direction shown by arrow 26 about hinge system 24.

In order to obtain a flow of fluid or liquid through the coffee or tea brewing system, basket top member 16 includes an elevated top cover 40. In the preferred embodiment, top cover 40 includes two ground coffee and tea leaf impervious screens 42, 44. As used herein, the term "tea leaf" includes cut and processed tea leaves available to consumers.

FIG. 2 diagrammatically illustrates a cross-sectional view of a coffee or tea brewer system 50. The primary difference between brewer system 50 and brewer system 10 is that brewer system 50 includes a hinge 52 which is placed in a cut-out on handle 12. In general, similar numerals designate similar items throughout all the drawings. Basket system 14 defines a volume 52 which retains ground coffee beans or tea leaf therein. More specifically, volume 52 measures a predetermined amount of ground coffee or tea when the coffee or tea fills to the top of the basket rim 54. Basket rim 54 defines a top plane 56–58. When the user scoops coffee or tea into basket region 52, and levels the coffee or tea at plane 56–58, that measure represents a predetermined amount of ground coffee beans or tea for a "perfect" or recommended single cup of coffee or tea. If the user wishes to brew a stronger cup of coffee or tea, the user simply heaps additional coffee or tea into basket region 52. For weaker cups of coffee or tea, the user would reduce the volume of coffee or tea contained by basket 52.

As a further development, basket 14 may include indicia at, for example, points 60,62 which identify the predetermined level of coffee necessary to brew a "perfect" cup of coffee. Similar indicia may be used for tea.

Basket 14 includes, at a bottom region 70, a ground coffee impervious screen 72. Screen 72 is maintained by an appropriate screen rim 74. Screen 72 is also impervious to cut tea leaf.

As explained above, in connection with FIG. 1, movable basket top member 16 includes a basket top cover 40 with two coffee ground and tea leaf impervious screens 42, 44. When coffee or tea is placed in basket region 52, and the user closes basket top member 16, hot liquid can flow through the brewing system 50 since liquid passes through the screens. The coffee grinds or tea leaf captured in region 52 mix with the hot liquid within region 52 and upper spatial region 53. When the liquid mixes with the coffee grinds or tea leaf, the coffee or tea flavor and ingredients are infused into liquid. Liquid is permitted to flow through screens 42, 44 and also through bottom screen 72.

FIG. 3 diagrammatically illustrates a cross-sectional view of basket 14 and basket top cover 40. FIG. 3 highlights the tongue and groove seal between cover 40 and basket 14. In the illustrated embodiment, basket 14 includes an upstanding rim or edge 80. Basket top cover 40 includes a groove or a channel 82 that is complementary to rim 80. When rim 80 is placed in channel 82, a tongue and groove seal is formed. The seal prohibits the flow of ground coffee beans or tea leaf from basket region 52 and upper space 53.

Other types of seals can be utilized such as a lower depending lip from basket top cover 40 which locks on a laterally extending ridge from the outer periphery of the basket. This laterally extending ridge would protrude in the direction shown by arrow 90 in FIG. 3. Another ridge protruding in the opposite direction would be located on the right side of basket 14.

FIG. 4 diagrammatically illustrates movable basket top member 16. FIG. 5 diagrammatically illustrates a cross-sectional view of top cover 40 and screen 44. Channel 80 of the basket seal system is specifically identified in FIG. 5.

FIGS. 6, 7 and 8 illustrate the use of the brewer system. FIG. 6 illustrates brewer 110 when the user has loaded coffee grind 112 (or tea leaf) into basket 114. Alternatively, FIG. 6 also illustrates the discharge phase when the user has opened basket top member 116 after he or she has brewed the coffee or tea. In this phase, the user would open basket top 116 and discard used coffee grounds 112 or tea leaves.

An important feature of the present invention is the fact that basket 114 measures a "perfect" cup of coffee. In a like manner, a high quality cup of tea may be produced. When coffee grinds 112 fill the basket to basket rim 118, a predetermined measure or amount of ground coffee beans is retained by the system. By closing cover 116, the user encapsulates coffee grind 112 in basket areas 52,53 (see FIG. 2).

FIG. 7 diagrammatically illustrates the infusion state when the user has placed brewer system 10 into liquid 130 held by cup 132. The user then swirls brewer system 10 or simply lets brewer system 10 sit in the liquid. Preferably, liquid 130 is hot. Since the brewing system is preferably made of plastic, the entire cup and brew system can be placed in a microwave during the brew phase.

The present invention is also meant to be used in conjunction with tea. As used herein, the term "a single cup of coffee" refers equally to a single cup of tea. However, the amount tea utilized to brew a "perfect cup of tea" varies from manufacturer to manufacturer. Special indicia may be located in basket region 52 for different levels of tea indicating different strengths of tea.

FIG. 8 diagrammatically illustrates the coffee brewing system 10 in the "drip" mode or phase. Bottom screen 140 is diagrammatically illustrated in FIG. 8 to illustrate that the "wet" ground coffee beans or tea leaves are dripping into mug 132.

As stated earlier, FIG. 6 shows the discharge phase when the user wishes to discard used coffee grounds 112 or tea leaf from brewer system 110.

The present brewer system is preferably made of plastic. Accordingly, the user may load the basket in region 52 with the appropriate amount of coffee or tea, close the basket and put the basket and brewing system into liquid 130 in cup 132. Thereafter, the user may place the entire system into a microwave and heat the cup, the water, or liquid and the brewer system. Preferably, screens 42, 44 and 74 are made of plastic. After the microwave heats liquid 130, the user withdraws the cup and stirs the brewing system using handle 12 until the appropriate brewing time has passed. Thereafter, the user lifts brewing system 10 from cup 130 and rests the brewing system atop lip 152 of cup 132. Excess liquid from the wet coffee grinds or tea leaves drips into liquid 130. This phase is shown in FIG. 8. Extending basket tab 32 and handle 12 opposite that tab are long enough such that the brewing system rests atop lip 152 of cup 132.

An additional important feature of the present invention is that the brewing system is portable. The user may load the brewing system 10, 50 prior to leaving his or her house. When he or she arrives at work the user may place the brewing system in a cup of hot liquid or a cup of ambient temperature liquid and then heat the ambient temperature liquid in a microwave.

In order to better infuse the liquid with the coffee or tea, basket top 40 (FIG. 2) is raised at least 10% percent higher than the depth of basket volume 52. This enables the coffee grind or tea leaves to swirl in basket region 52, 53 and better infuse the liquid with the coffee or tea.

FIG. 9 diagrammatically illustrates another embodiment of the brewing basket with the saucer captured in the basket. Similar numerals designate similar items in these figures. Brewer basket cover 16 includes a base arm 110 which is mounted via pivot pin 112 to handle 12. The interior 52 of brewer basket 14 carries a saucer 114. Preferably, saucer 114 is made of plastic.

In FIG. 10, brewer system 10 is set atop saucer 114. FIG. 11 shows saucer 114 having a flat plate or bottom 116 and a raised peripheral wall 118. Wall 118 has a small dimension 120 sufficient to capture droplets of brewed coffee or brewed tea after the brewing cycle shown in FIGS. 7 and 8. FIG. 13 shows a tea bag 122 resting atop saucer 114. Saucer 114 has a length 130 slightly smaller than interior basket length 132. In a like manner, the width 134 of saucer 114 is slightly less than the width of the basket. In this manner, saucer 114 is captured within the interior space 52 of basket 14. The inclination of peripheral wall 118 is preferably similar to the inclination of the interior wall of basket 14.

To further enhance its utilization, saucer 114 has imprinted, on back surface 140, instructions for use of the brewer system. By imprinting the instructions on the saucer, it is not necessary for the user to carry any other papers, documents or other containers regarding the use of the brewing system. Further, the saucer may carry advertisements. As such, every time the user utilizes the brewing system, the user will be reminded of a certain coffee or a certain tea. This constant advertising capability of the saucer or the instructional indicia) represent other important functional features of the present invention.

FIGS. 14a and 14b diagrammatically illustrate base arm 110 of basket cover 16 pivotally mounted via plastic pivot 112 on handle 12. As shown in these figures, base arm 110 has a forward portion 160 and a rearward portion 162 which are divided by an inverted V-shaped cutout or formation 164. As shown in FIG. 14b, this enables forward portion 160 to be raised above arm 12 at the V-joint. The joint is a hinge.

FIG. 15 shows basket cover 16 rotated in the direction shown by arrow 180 about pivot point 112. V-shaped joint 164 is also diagrammatically illustrated.

The benefits of having the saucer in the brew system are: (a) the concealed saucer enables the user to better utilize the brew system without "dripping" coffee or tea after the brew cycle shown in FIGS. 7–8; (b) the saucer, when encapsulated or captured in the brewer basket, provides a portable brewing system; and (c) the saucer can be utilized as a drip stand for the brewer basket or a tea bag without significant difficulty.

The claims appended hereto are meant to cover modifications and changes within the spirit and scope of the present invention.

What is claimed is:

1. A saucer and a single cup coffee brewer system, said brewer adopted to retain a predetermined amount of ground coffee beans for a single cup of brewed coffee comprising:

a brewer including:
an elongated handle;
a basket formed on one end of said handle, said basket having a top, peripheral rim and a ground coffee impervious screen at a bottom region thereof, said basket having a volumetric size substantially equivalent to said predetermined amount of ground coffee, said volumetric size established below a top plane of said basket rim;
a movable basket top member having a leg hinged to said handle and having an elevated basket top cover, said basket top cover having at least one ground coffee impervious screen disposed over said basket thereby permitting liquid to flow through said basket and retained ground coffee beans, said basket top cover having complementary rim which cooperates with said basket rim to seal said ground coffee beans in said basket; and,
said basket rim and said basket cover complementary rim form a tongue and groove structure providing said seal for said retained coffee beans; and,
a saucer including:
a flat plate, which is larger than said ground coffee impervious screen at said bottom region of said basket, said flat plate having a raised rim rising above said plate, said raised rim establishing an outer peripheral dimension of said saucer which is smaller than one of a plurality of cross-sectional basket dimensions below said top plane of said basket rim, such that said saucer is adapted to fit within said basket.

2. A brewer system as claimed in claim 1 wherein said volumetric size of said basket is established at a top plane of said basket rim such that a user measures said predetermined amount of ground coffee beans at said top plane of said basket.

3. A brewer system as claimed in claim 1 wherein said handle, said basket, said basket screen, said basket top member and said basket top cover screen is made of plastic such that said brewer is microwavable.

4. A brewer system as claimed in claim 1 wherein said saucer carries instructional indicia or advertising indicia.

5. A brewer system as claimed in claim 1 wherein said basket top cover includes two basket top cover screens longitudinally spaced apart on said basket top cover.

6. A brewer system as claimed in claim 1 wherein said basket rim and said basket cover complementary rim form a tongue and groove structure providing said seal for said retained ground coffee beans.

7. A brewer system as claimed in claim 1 wherein said handle and basket form an elongated rectangular shape adopted to fit a coffee cup.

8. A brewer system as claimed in claim 2 wherein said handle, said basket, said basket screen, said basket top member and said basket top cover screen is made of plastic such that said brewer is microwavable.

9. A brewer system as claimed in claim 8 wherein said basket top cover screen is elevated above said basket rim at least ten percent higher than a depth of said basket.

10. A brewer system as claimed in claim 9 wherein said basket top cover includes two basket top cover screens longitudinally spaced apart on said basket top cover.

11. A brewer system as claimed in claim 10 wherein said basket rim forms said tongue and said basket cover complementary rim forms said groove in said tongue and groove structure.

12. A brewer system as claimed in claim 11 wherein said handle and basket form an elongated rectangular shape adopted to fit a coffee cup.

13. A saucer and a single cup coffee or tea brewer system, said brewer adopted to retain ground coffee beans or tea leaves for a single cup of brewed coffee or tea comprising:
   a brewer including:
      an elongated handle;
      a basket formed on one end of said handle, said basket having a top, peripheral rim and a ground coffee and tea leaves impervious screen at a bottom region thereof, said basket having a volumetric size for a predetermined amount of ground coffee or tea leaves, said volumetric size established below a top plane of said basket rim;
      a movable basket top member having a leg hinged to said handle and having an elevated basket top cover, said basket top cover having at least one ground coffee and tea leaves impervious screen disposed over said basket thereby permitting liquid to flow through said basket and retained ground coffee beans or tea leaves, said basket top cover having complementary rim which cooperates with said basket rim to seal said ground coffee beans or tea leaves in said basket; and,
   a drip tray saucer including:
      a flat plate, which is larger than said impervious screen at said bottom region of said basket, said flat plate having a raised rim rising above said plate, said raised rim establishing an outer peripheral dimension of said drip tray saucer which is smaller than one of a plurality of cross-sectional basket dimensions below said top plane of said basket rim, such that said drip tray saucer is adapted to fit within said basket.

14. A brewer system as claimed in claim 13 wherein said volumetric size of said basket is established at a top plane of said basket rim such that a user measures said predetermined amount of ground coffee beans or tea leaves at said top plane of said basket.

15. A brewer system as claimed in claim 13 wherein said handle, said basket, said basket screen, said basket top member and said basket top cover screen is made of plastic such that said brewer is microwavable.

16. A brewer system as claimed in claim 13 wherein said drip tray saucer carries indicia describing one use of said brewer system and advertising indicia.

17. A brewer system as claimed in claim 16 wherein said handle, said basket, said basket screen, said basket top member and said basket top cover screen is made of plastic such that said brewer is microwavable.

18. A brewer for a single cup of coffee or tea, said brewer adopted to retain a predetermined amount of ground coffee beans for a single cup of brewed coffee or tea leaves for a single cup of brewed tea, comprising:
   an elongated handle;
   a basket formed on one end of said handle, said basket having a top, peripheral rim and a ground coffee and tea leaves impervious screen at a bottom region thereof, said basket having a volumetric size substantially equivalent to said predetermined amount of ground coffee or tea leaves, said volumetric size established below a top plane of said basket rim;
   a movable basket top member having a leg hinged to said handle and having an elevated basket top cover, said basket top cover having at least one ground coffee and tea leaves impervious screen disposed over said basket thereby permitting liquid to flow through said basket and retained ground coffee beans or tea leaves, said basket top cover having complementary rim which cooperates with said basket rim to seal said ground coffee beans or tea leaves in said basket; and,
   said basket rim and said basket cover complementary rim form a tongue and groove structure providing said seal for said retained coffee beans or tea leaves.

19. A brewer system as claimed in claim 18 wherein said volumetric size of said basket is established at a top plane of said basket rim such that a user measures said predetermined amount of ground coffee beans or tea leaves at said top plane of said basket.

20. A brewer system as claimed in claim 19 wherein said handle, said basket, said basket screen, said basket top member and said basket top cover screen is made of plastic such that said brewer is microwavable.

21. A brewer system as claimed in claim 20 wherein said basket rim forms a tongue and said basket cover complementary rim forms a groove for said tongue and groove structure.

22. A single cup coffee or tea brewer system, said brewer adopted to retain a predetermined amount of ground coffee beans or tea leaves for a single cup of brewed coffee or tea comprising:
   a brewer including:
      an elongated handle;
      a basket formed on one end of said handle, said basket having a top, peripheral rim and a ground coffee or tea leaf impervious screen at a bottom region thereof, said basket having a volumetric size substantially equivalent to said predetermined amount of ground coffee or tea leaves, said volumetric size established below a top plane of said basket rim;
      a movable basket top member having a leg hinged to said handle and having an elevated basket top cover, said basket top cover having at least one ground coffee or tea leaf impervious screen disposed over said basket thereby permitting liquid to flow through said basket and retained ground coffee beans or tea leaves, said basket top cover having complementary rim which cooperates with said basket rim to seal said ground coffee beans or tea leaves in said basket; and, said hinged leg permitting rotative movement in a plane parallel to said elongated handle via a normally disposed pivot pin extending through said plane and said elongated handle and said hinged leg permitting pivotal movement out of said plane about a V-joint juxtaposed next to said elongated handle.

23. A brewer system as claimed in claim 22 wherein said basket rim and said basket cover complementary rim form a tongue and groove structure providing said seal for said retained coffee beans or tea leaves.

24. A brewer system as claimed in claim 22 including a drip plate saucer plate, which is larger than said ground coffee and tea leaf impervious screen at said bottom region of said basket, said saucer plate having a raised rim rising above said plate, said raised rim establishing an outer peripheral dimension of said saucer plate which is smaller than one of a plurality of cross-sectional basket dimensions below said top plane of said basket rim, such that said saucer plate is adapted to fit within said basket.

25. A brewer system as claimed in claim 24 wherein said basket rim and said basket cover complementary rim form a tongue and groove structure providing said seal for said retained coffee beans or tea leaves.

26. A brewer system as claimed in claim 22 wherein said handle and basket form an elongated rectangular shape adopted to fit a coffee cup.

27. A brewer system as claimed in claim 22 wherein said handle, said basket, said basket screen, said basket top member and said basket top cover screen is made of plastic such that said brewer is microwavable.

* * * * *